United States Patent [19]
Kishimoto et al.

[11] 4,391,036
[45] Jul. 5, 1983

[54] PROCESS FOR PRODUCING SEALED LEAD-ACID BATTERY

[75] Inventors: Kenjiro Kishimoto; Hideaki Igarashi; Migaki Kono, all of Osaka, Japan

[73] Assignee: Yuasa Battery Company Limited, Takatsuki, Japan

[21] Appl. No.: 288,791

[22] Filed: Jul. 31, 1981

[51] Int. Cl.$^3$ ............................................ H01M 10/04
[52] U.S. Cl. .................................... 29/623.2; 429/190; 29/623.5
[58] Field of Search ....................... 429/188, 189, 190; 29/623.1, 623.5, 623.2

[56] References Cited

U.S. PATENT DOCUMENTS

| | | | |
|---|---|---|---|
| 3,172,782 | 3/1965 | Joche | 429/190 |
| 3,402,077 | 9/1968 | Kida et al. | 429/190 |

FOREIGN PATENT DOCUMENTS

| | | | |
|---|---|---|---|
| 54-114730 | 9/1979 | Japan | 429/190 |
| 785848 | 11/1957 | United Kingdom | 429/190 |
| 1347471 | 2/1974 | United Kingdom | 429/189 |

Primary Examiner—Donald L. Walton
Attorney, Agent, or Firm—Watson, Cole, Grindle & Watson

[57] ABSTRACT

A plate group is formed of positive and negative plates and separators formed mostly of glass fibers of a diameter not thicker than 1.0 micron and is inserted into a container. Then, a sulfuric acid electrolyte of a concentration of a viscosity increasing agent of 0 to 3.0% by weight is first poured in an amount smaller than the total pore volume of the plate group and a sulfuric acid electrolyte of a concentration of the viscosity increasing agent higher than in the above poured sulfuric acid electrolyte is then poured in so that the total poured amount may be the same as or larger than the total pore volume of the plate group.

The sealed lead-acid battery obtained as mentioned above has an excellent discharge characteristic and gas recombining performance, is low in the internal resistance, is long in the service life and does not leak the electrolyte.

8 Claims, 2 Drawing Figures

PROCESS FOR PRODUCING SEALED LEAD-ACID BATTERY

BACKGROUND OF THE INVENTION

1. Field of the Invention

The present invention relates to a sealed lead-acid battery having a good discharge characteristic, a good gas recombination performance and a long life expectency, as well as a sealed lead-acid battery which is unlikely to leak its electrolyte regardless of its orientation. The invention also relates to a process for producing such a sealed lead-acid battery.

2. Description of the Prior Art

A lead-acid battery can be sealed by utilizing a so-called "oxygen cycle" wherein the oxygen gas generated from the positive plates at the end of charge is recombined by the negative plates. In order to promote the movement of the oxygen gas generated by the positive plates to the negative plates and the velocity of the combination with the oxygen gas of the negative plates or, in other words, to increase the gas recombination rate, the amount of the electrolyte in the plate group must be kept as small as possible. Also, in order to prevent the sulfuric acid electrolyte from leaking out of the battery and to increase the leakproofness of the battery, it is not desirable that the unfixed free sulfuric acid electrolyte be present in the battery and therefore it is necessary that the sulfuric acid electrolyte be fixed only in the pores in the positive and negative plates and such bodies interposed between the plates as separators.

There are already methods of fixing the sulfuric acid electrolyte of a lead-acid battery of this kind wherein the electrolyte is absorbed and retained in porous bodies as separators (refer, for example, to U.S. Pat. No. 3,862,861 to D. H. McClelland et al. and U.S. Pat. No. 3,553,020 to R. L. Corbin et al.) and wherein the electrolyte is gelled and fixed (refer, for example, to U.S. Pat. No. 3,765,942 to U. Jache and U.S. Pat. No. 3,776,779 to B. L. Johnson). The best porous body to be used in the former method is a porous body formed mostly of glass fibers of a diameter not thicker than 1.0 micron. If it is used, a battery particularly very high in discharge performance, life performance and gas recombination performance will be obtained. However, with it, there are defects that, as special glass fibers are used, the cost is high, that, in order to improve the leakproofness, it is necessary to strictly keep the poured amount of the sulfuric acid electrolyte the same as or rather smaller than the total pore volume of the plate group and that, even in the control of this electrolyte pouring step, the cost in high. Further, in this kind of lead-acid battery, there are drawbacks: the capacity is regulated usually by the amount of the electrolyte instead of the positive and negative plates or, in other words, by the amount of the sulfuric acid, on the other hand, the amount of the electrolyte is strictly limited from the viewpoint of the gas recombination and leakproofness, therefore, if the capacity of the battery is to be increased within the limited volume, the amount of the sulfuric acid radical must be increased by using a sulfuric acid electrolyte of a high concentration, therefore the self-discharge will increase, the deterioration of the plates will be accelerated and the life performance will be reduced. On the other hand, in the latter method, there are the drawbacks that, as the gelling agent of a high concentration is used, the internal resistance will become high and the discharge characteristic, and particularly the high rate discharge characteristic, will be very bad. Further, when the sulfuric acid electrolyte is gelled, plasmolysis water will be always produced within the battery. Therefore, there is a defect that the leakproofness of the battery is essentially lower than in using the above-described porous bodies. Further, as the gelled sulfuric acid electrolyte is used, it is so difficult to pour the electrolyte into the battery that the electrolyte pouring step will become complicated and the obtained battery cannot help but be expensive.

An object of the present invention is to provide a sealed lead-acid battery which is high in its discharge characteristic and particularly in its high rate discharge characteristic, has no leakage of the electrolyte and has a long service life.

Another object of the present invention is to provide a process for cheaply and simply producing the above-described battery.

SUMMARY OF THE INVENTION

The sealed lead-acid battery according to the present invention is characterized in that a plate group is formed of positive and negative plates and separators formed mostly of glass fibers of a diameter not thicker than 1.0 micron, a sulfuric acid electrolyte of a concentration of a viscosity-increasing agent of 0.01 to 4.0% by weight is provided and the concentration of the viscosity-increasing agent in the electrolyte is made higher in the peripheral part of the plate group than in the central part of the plate group.

Further, the process for producing lead-acid batteries according to the present invention is characterized in that a plate group formed by arranging in the form of layer positive and negative plates through separators formed mostly of glass fibers of a diameter not thicker than 1.0 micron is inserted into a container, then a sulfuric acid electrolyte of a concentration of a viscosity-increasing agent of 0 to 3.0% by weight is poured in an amount smaller than the total pore volume of the plate group and then a sulfuric acid electrolyte of a concentration of the viscosity-increasing agent higher than in the above poured sulfuric acid electrolyte is poured in so that the total poured amount may be the same as or larger than the total pore volume of the plate group.

Further objects, advantages and features of the present invention will become more fully apparent from a detailed consideration of the arrangement and construction of the constituent parts as set forth in the following specification taken together with the accompanying drawings.

DETAILED DESCRIPTION OF PREFERRED EMBODIMENTS

Figure 1:
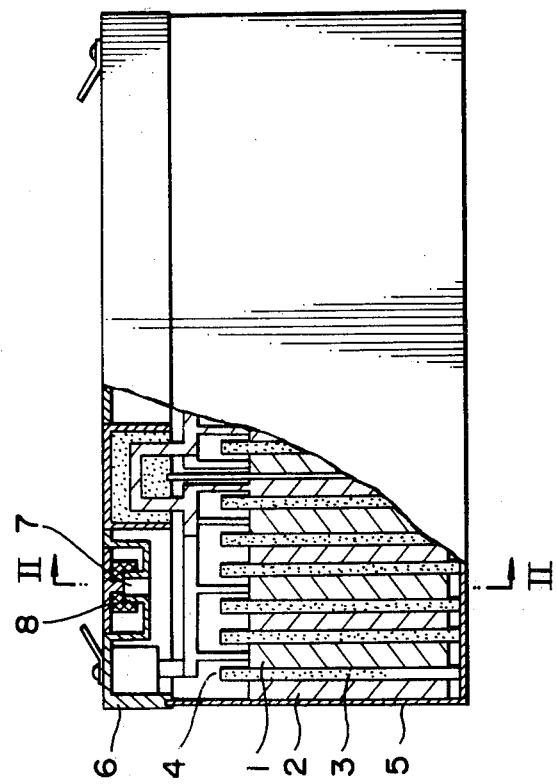
FIG. 1 is a partly sectioned elevation showing a sealed lead-acid battery according to the present invention.

The formation of a sealed lead-acid battery according to the present invention shall be explained with reference to FIGS. 1 and 2 along with the process for producing the same.

A plate group 4 is formed by arranging separators 3 formed mostly of glass fibers of a diameter not thicker than 1.0 micron between positive and negative plates and is inserted into a container 5 and an opening of the electrolytic cell is convered with a lid 6. Meanwhile, a sulfuric acid electrolyte of a concentration of viscosity-increasing agent of 0 to 3.0% by weight is poured in an amount rather smaller than the total pore volume of the plate group 4 through an electrolyte pouring and gas venting tube 7 and then a sulfuric acid electrolyte of a concentration of the viscosity-increasing agent higher than in the above poured sulfuric acid electrolyte is poured in so that the total poured amount of the electrolyte may be the same as or larger than the total pore volume of the plate group 4. Then a safety valve 8 is inserted and fitted in the electrolyte pouring and gas venting tube 7. Thus a sealed lead-acid battery is obtained.

Sealed lead-acid batteries according to the present invention and sealed lead-acid batteries not according to the present invention were experimentally made and were experimented with. They shall be detailed in the following.

Experiment 1:

A plate group was formed by arranging between positive and negative plates separators of a fiber ratio of 60% by weight of glass fibers of a diameter of 0.75 micron, 30% by weight of glass fibers of a diameter of 3.0 microns and 10% by weight of glass fibers of a diameter of 11.0 microns and was placed in a container and a lid was fitted to the cell to assemble a battery into which no electrolyte had been yet poured. A sulfuric acid electrolyte in an amount of 60% of the total pore volume of the plate group was poured into this battery. Silica having a specific surface area of 350 m²/g was added at various rates to the sulfuric acid electrolyte in the case of the first pouring of the electrolyte. Then, a sulfuric acid electrolyte containing 4.0% by weight of silica was poured in as the second pouring so that the total poured amount might be the same as the total pore volume of the plate group. Thereafter, according to the normal process, a safety valve and the like were arranged to obtain a sealed lead-acid battery of 6 V–6 AH. The internal resistance, 0.05c discharge capacity and 2c discharge capacity were measured on each of the obtained sealed lead-acid batteries, sealed lead-acid batteries to which no silica had been added at all and conventional gel type sealed lead-acid batteries. The results are shown in Table 1. By the way, in Table 1, Nos. 1, 8 and 9 are sealed lead-acid batteries not according to the present invention and Nos. 2 to 7 are sealed lead-acid batteries according to the present invention.

TABLE 1

| No. | Added amount of silica (% by weight) First time | Added amount of silica (% by weight) Second time | Internal resistance (mΩ) | 0.05 c discharge capacity (AH) | 2 c discharge Capacity (AH) | 2 c discharge 30th second voltage (V) |
|---|---|---|---|---|---|---|
| 1 | 0 | 0 | 16 | 6.0 | 2.6 | 5.98 |
| 2 | 0 | 4 | 16 | 6.0 | 2.6 | 5.98 |
| 3 | 0.01 | 4 | 16 | 6.0 | 2.6 | 5.98 |
| 4 | 0.1 | 4 | 16 | 6.0 | 2.6 | 5.98 |
| 5 | 0.5 | 4 | 16 | 6.0 | 2.6 | 5.98 |
| 6 | 1 | 4 | 16 | 6.0 | 2.6 | 5.98 |
| 7 | 3 | 4 | 16 | 6.0 | 2.6 | 5.98 |
| 8 | 5 | 4 | 28 | 5.6 | 2.4 | 5.89 |
| 9 | Conventional gel type sealed lead-acid battery | | 50 | 6.1 | 1.8 | 5.55 |

Experiment 2:

Batteries in which no electrolyte had been yet poured were made by the same process as in Experiment 1. As the first poured electrolyte, each of sulfuric acid electrolytes to which respectively 0, 0.5 and 3.0% by weight of silica had been added was poured in an amount of 90% of the total pore volume of the plate group. Then, as the second poured electrolyte, each of electrolytes to which respectively 0, 0.8 and 3.5% by weight of silica had been added was poured in so that the total poured amount of the electrolyte might be each of 1.0, 1.1, 1.2 and 1.3 times as large as the total pore volume of the plate group to obtain a sealed lead-acid battery of 6 V. On each battery, whether a free electrolyte was present or not, the 0.05c discharge capacity, 2c discharge capacity, leakproofness by a 0.05 A continuous overcharge with the battery inverted and gas recombination rate from the weight reduction in the overcharge were measured. The results are as shown in Table 2. By the way, in Table 2, Nos. 11 to 14 and 23 are sealed lead-acid batteries not according to the present invention and Nos. 15 to 22 are sealed lead-acid batteries according to the present invention.

TABLE 2

| No. | Added amount of silica (% by weight) First time | Added amount of silica (% by weight) Second time | Poured amount ratio* | Whether a free electrolyte was present or not when the electrolyte was poured | 0.05 c discharge capacity (AH) | 2 c discharge capacity (AH) | Leakage starting time (hrs) | Gas recombination rate (%) at the time of overcharge |
|---|---|---|---|---|---|---|---|---|
| 11 | 0 | 0 | 1.0 | Absent | 6.0 | 2.6 | Not less than 5000 (no leakage) | 100 |
| 12 | 0 | 0 | 1.1 | Present | 6.1 | 2.6 | 850 | 88 |
| 13 | 0 | 0 | 1.2 | Present | 6.1 | 2.6 | 103 | 73 |
| 14 | 0 | 0 | 1.3 | Present | 6.2 | 2.6 | 103 | 60 |
| 15 | 0.5 | 0.8 | 1.0 | Absent | 6.0 | 2.6 | Not less than 5000 (no leakage) | 100 |
| 16 | 0.5 | 0.8 | 1.1 | Absent | 6.6 | 2.7 | Not less than 5000 (no leakage) | 100 |
| 17 | 0.5 | 0.8 | 1.2 | Absent | 6.6 | 2.7 | Not less than 5000 (no | 100 |

TABLE 2-continued

| No. | Added amount of silica (% by weight) First time | Added amount of silica (% by weight) Second time | Poured amount ratio* | Whether a free electrolyte was present or not when the electrolyte was poured | 0.05 c discharge capacity (AH) | 2 c discharge capacity (AH) | Leakage starting time (hrs) | Gas recombination rate (%) at the time of overcharge |
|---|---|---|---|---|---|---|---|---|
| 18 | 0.5 | 0.8 | 1.3 | Present | 6.6 | 2.7 | leakage) Not less than 5000 (no leakage) | 95 |
| 19 | 3.0 | 3.5 | 1.0 | Absent | 6.0 | 2.6 | Not less than 5000 (no leakage) | 100 |
| 20 | 3.0 | 3.5 | 1.1 | Absent | 6.5 | 2.7 | Not less than 5000 (no leakage) | 100 |
| 21 | 3.0 | 3.5 | 1.2 | Absent | 6.6 | 2.7 | Not less than 5000 (no leakage) | 100 |
| 22 | 3.0 | 3.5 | 1.3 | Absent | 6.7 | 2.7 | Not less than 5000 (no leakage) | 100 |
| 23 | Conventional gel type sealed lead-acid battery | | | Present | 6.1 | 1.8 | 56 | 52 |

*Poured amount ratio = First time poured amount (c.c.) + Second time poured amount (c.c.)/Total pore volume (c.c.) of the plate group. = Total poured amount (c.c.)/Total pore volume (c.c.) of the plate group.

Figure 2:
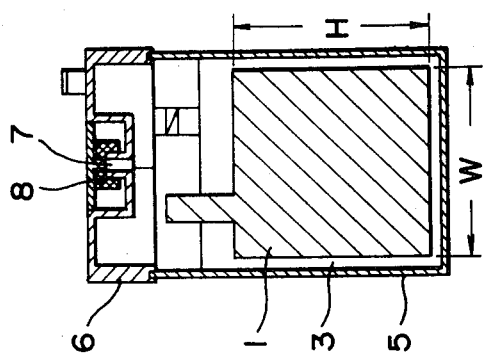
FIG. 2 is a sectioned view on line II—II in FIG. 1.

Experiment 3:

A plate group was formed of separators of a fiber ratio of 70% by weight of glass fibers of a diameter of 0.75 micron, 25% by weight of glass fibers of a diameter of 6.0 microns and 5% by weight of glass fibers of a diameter of 13.0 microns and positive and negative plates of a height H of 95 mm shown in FIG. 2 and cut off in the width direction to vary the width W so that the ratio H/W of the height H to the width W might be each of 0.8, 1.1, 1.5, 2.0 and 3.0 and was contained in a container and a lid was fitted to the container to assemble a battery in which no electrolyte had yet been poured. An electrolyte to which silica had been added was poured as divided twice into this battery so as to be of the same amount as the total pore volume of the plate group. On each obtained sealed lead-acid battery in the normal upright posture, alternate charge and discharge life tests were made. The results were as shown in Table 3. By the way, in Table 3, Nos. 31 to 35 are sealed lead-acid batteries not according to the present invention and Nos. 36 to 45 are sealed lead-acid batteries according to the present invention.

TABLE 3

| No. | Added amount of silica (% by weight) First time | Added amount of silica (% by weight) Second time | H/W | Life cycle (∞) |
|---|---|---|---|---|
| 31 | 0 | 0 | 0.8 | 863 |
| 32 | 0 | 0 | 1.1 | 620 |
| 33 | 0 | 0 | 1.5 | 614 |
| 34 | 0 | 0 | 2.0 | 131 |
| 35 | 0 | 0 | 3.0 | 86 |
| 36 | 1.0 | 1.2 | 0.8 | 935 |
| 37 | 1.0 | 1.2 | 1.1 | 877 |
| 38 | 1.0 | 1.2 | 1.5 | 870 |
| 39 | 1.0 | 1.2 | 2.0 | 680 |
| 40 | 1.0 | 1.2 | 3.0 | 564 |
| 41 | 2.0 | 2.5 | 0.8 | 941 |
| 42 | 2.0 | 2.5 | 1.1 | 892 |
| 43 | 2.0 | 2.5 | 1.5 | 868 |
| 44 | 2.0 | 2.5 | 2.0 | 870 |
| 45 | 2.0 | 2.5 | 3.0 | 799 |

It is found from Table 1 that, in case the electrolyte in the same amount as the total pore volume of the plate group was poured in, the sealed lead-acid batteries according to the present invention of Nos. 2 to 7 were not different from the sealed lead-acid battery not according to the present invention of No. 1 in both discharge capacity and discharge voltage but were smaller than the gel type sealed lead-acid battery of No. 9 in the internal resistance and were high in the discharge capacity and particularly in the high rate discharge characteristics. Further, it is found from the results in Table 2 that there are defects that, in case the poured amount was larger than the total pore volume of the plate group, in each of the sealed lead-acid batteries not according to the present invention of Nos. 11 to 14 absorbed merely with the ordinary sulfuric acid electrolyte, when the amount of the electrolyte was increased, a free electrolyte was appeared but, with this treatment, the capacity did not increase too much, the leakage began very early and the gas recombination reduced greatly. On the other hand, it is found that, in the sealed lead-acid battery according to the present invention, the high rate discharge capacity did not vary so much but the low rate discharge capacity increased by more than 10% and there was no leakage at all. Further, it is found from the results in Table 3 that, in the sealed lead-acid battery according to the present invention, the plates in which the ratio H/W of the height H to the width W is larger than 1.0, in other words, the so-called longitudinary long plates to be used are very effective to elongate the life of the battery.

The reason for the results in Table 2 is considered to be as follows. That is to say, it is considered that, in the sealed lead-acid battery according to the present invention, when a sulfuric acid electrolyte of a concentration of a viscosity increasing agent of 0 to 3.0% by weight is first poured in an amount smaller than the total pore volume of the plate group, the concentration of the viscosity-increasing agent in the sulfuric acid electrolyte will be made very low in the center part of the plate group and, when a sulfuric acid electrolyte higher in the concentration of the viscosity-increasing agent than the above poured sulfuric acid electrolyte is then poured in so that the total poured amount of the electrolyte may be the same as or larger than the total pore volume of the plate group, the concentration of the viscosity-increasing agent in the sulfuric acid electrolyte will be higher in the peripheral part of the plate group so that the concentration distribution of the viscosity-increasing agent may be such that the sulfuric acid electrolyte of an average concentration of the viscosity-increasing agent of 0.01 to 4.0% by weight may be well fluid in the center part of the plate group but may be hardly fluid in the peripheral part of the plate group. Thus, the sealed lead-acid battery according to the present invention has features that the internal resistance will never become so high as in the conventional gel type sealed lead-acid battery and, in case the sulfuric acid electrolyte is pushed out of the plate pores by the sulfuric acid discharged out of the plates at the end of the charge and the gas generated at the end of the charge and a free electrolyte comes out within the battery, the sulfuric acid electrolyte of the high concentration of the viscosity-increasing agent in the peripheral part of the plate group will absorb the free electrolyte and therefore no free electrolyte will be present at all within the battery. Further, the sealed battery according to the present invention has a feature that, in case the concentration of sulfuric acid in the sulfuric acid electrolyte in the plate group reduces in the low rate discharge, sulfuric acid will be fed to the plate group from the sulfuric acid electrolyte containing much viscosity-increasing agent in the peripheral edge part of the plate group and therefore the discharge capacity will increase. Further, the sealed lead-acid battery according to the present invention has an advantage that, in case the electrolyte is poured in from the upper part of the plate group as in the above-mentioned experimentally making examples, the concentration of the viscosity-increasing agent in the sulfuric acid electrolyte in the vicinity of the upper part of the plate group will be so high that not only the concentration gradient of the sulfuric acid in the sulfuric acid electrolyte but also the diffusing force by the self-weight will be added to the sulfuric acid supplying force.

On the other hand, in the conventional sealed lead-acid battery in which porous bodies are only impregnated with a sulfuric acid electrolyte, even if the amount of the electrolyte is increased, the capacity will not substantially increase and the electrolyte utilizing rate will reduce, because it is considered that, as an excess sulfuric acid electrolyte is present in the lower part of the plate group, when the concentration of sulfuric acid in the plate group reduces in the low rate discharge, the diffusion by the concentration gradient of the electrolyte will occur against the gravity and relatively the diffusing force will become very slight.

Thus, in the sealed lead-acid battery according to the present invention, even if the sulfuric acid electrolyte is poured in an amount in excess of the total pore volume of the plate group, it will not leak at all and almost all of the poured sulfuric acid electrolyte will be utilized; therefore, it is not necessary to use a sulfuric acid electrolyte high in the concentration of sulfuric acid as in the conventional one in order to secure a large volume within a limited volume, the electrolyte of a low sulfuric acid concentration can be used. Thus a sealed lead-acid battery of a small self-discharge, long service life and high capacity is obtained, yet the price can be reduced by reducing the thickness of the expensive separator, the poured amount of the electrolyte need not be headed so much as in the conventional one and therefore a sealed lead-acid battery cheap in the steps is obtained.

Further, the reasons for the results in Table 3 are considered to be as follows. That is to say, when the plates are longitudinally long, the concentration of the sulfuric acid electrolyte in the separators will tend to be non-uniform in the vertical direction. This is because the retention of the sulfuric acid electrolyte in this kind of separator is maintained only by the capillary phenomenon or, in other words, capillary force by the fine pore diameters of the separator and; therefore, when the separator is narrow and high, the capillary force to pull the sulfuric acid electrolyte in the lower part up to the upper part will be short. In the sealed lead acid battery in which the sulfuric acid electrolyte is absorbed and retained in porous bodies, the pore diameter can not be made extremely small and therefore the above is an essentially unavoidable problem. However, in the case of the sealed lead-acid battery according to the present invention, the sulfuric acid electrolyte has a viscosity and is therefore controlled in the movement and thus the concentration can be prevented from being made non-uniform by the self-weight of the electrolyte.

As evident even from the results in Table 3, in the sealed lead-acid battery according to the present invention, even if the ratio H/W of the height H to the width W is larger than 2.0, a sufficient life performance will be yet held. Further, it is needless to say that, in such case, in order to improve both life performance and discharge characteristic, with the increase of the ratio H/W, the concentration of the viscosity increasing agent in the sulfuric acid electrolyte should be made high. By the way, in this kind of separator, the maximum height at which the concentration of the sulfuric acid in the sulfuric acid electrolyte is not made non-uniform by the self-weight of the separator is 60 mm. Therefore, the present invention is effective particularly as applied to a sealed lead-acid battery in which the height H of the plates is larger than 60 mm.

In each of the above experimentally making examples, silica is used as a viscosity-increasing agent. However, the present invention is not to be limited to it. Even with any single one or any mixture of oxide powders of aluminum, titanium and magnesium, the same result is obtained. However, what is important to the viscosity-increasing agent is its added amount which must be 0.01 to 4.0% by weight to the sulfuric acid electrolyte. That is to say, when it is less than 0.01% by weight, there will be no effect at all and, when it is more than 4.0% by weight, the viscosity will be so high that not only the pouring will be difficult and the discharge capacity will reduce but also the internal resistance of the battery will unnecessarily increase and the discharge voltage characteristic will decrease as evident in the light of Table 1. By the way, when the specific surface area of the viscosity-increasing agent is larger than 200 m$^2$/g, with a smaller added amount, a larger effect will be obtained and therefore it will be preferable.

The separator to be used in the present invention is formed of glass fibers in which glass fibers of a diameter not thicker than 1.0 micron are the most, glass fibers of a diameter thicker than 1.0 micron are present as mixed and more preferably glass fibers having a diameter of 10 to 20 microns are present as mixed, is high in the mechanical strength, is easy to assemble and is therefore most suitable. In such case, the separator formed by merely entangling glass fibers without using any binder between the fibers will not stain the negative plate, will obtain a high gas recombination rate and will be preferable.

In the method of adding the viscosity-increasing agent to the electrolyte, when the agent is added to the sulfuric acid electrolyte in advance as in the previous experiment examples, the resulting process will not be different at all from the conventional process, a cheap sealed lead-acid battery will be obtained and it will be desirable. Otherwise, the viscosity-increasing agent may be arranged in the peripheral part of the plate group before the electrolyte is poured in and then the sulfuric acid electrolyte may be poured in.

Thus, according to the present invention, the poured amount of the electrolyte is not required to be so strictly controlled as in the past, further the capacity by using the same plates within the same volume can be elevated by merely increasing the amount of the electrolyte without elevating the concentration of the sulfuric acid electrolyte and therefore a very cheap sealed lead-acid battery can be obtained. Further, in the sealed lead-acid battery according to the present invention, the concentration of the viscosity-increasing agent in the part between both positive and negative plates is not so high, therefore the internal resistance and discharge characteristic are not different at all from those of the conventional lead-acid battery using porous bodies, the concentration of the viscosity-increasing agent in the peripheral part of the plate group is so high that, even in case a free electrolyte is produced, it will be recombined and therefore the sulfuric acid electrolyte will never leak out of the battery, in case the concentration of the sulfuric acid electrolyte within the plate group is made low by the discharge or particularly by the low rate discharge, the sulfuric acid radical will be fed from the peripheral part of the plate group, therefore the discharge will be maintained and the electrolyte utilizing rate will be higher than in the conventional one and such very ideal balanced distribution of the sulfuric acid electrolyte will be obtained. Further, as the sulfuric acid electrolyte has a viscosity, the sealed lead-acid battery according to the present invention has overcome the essential problem that the concentration distribution of the sulfuric acid electrolyte is non-uniform in the vertical direction in the conventional sealed lead-acid battery in which porous bodies are merely impregnated with the sulfuric acid electrolyte.

Therefore, according to the present invention, a sealed lead-acid battery low in the internal resistance, having a better discharge characteristic, gas recombining performance and life performance and never likely to leak the electrolyte in any posture can be obtained cheaply and therefore its industrial value is large.

While the present invention has been described with reference to particular embodiments thereof, it will be understood that numerous modifications may be made by those skilled in the art without actually departing from the spirit and scope of the invention as defined in the appended claims.

We claim:

1. A process for producing a sealed lead-acid battery comprising the steps of
    positioning a plate group in a container, the plate group being formed of positive and negative plates with separators therebetween, the separators being formed mostly of glass fibers having diameters of not more than 1.0 micron,
    arranging a viscosity-increasing agent in the peripheral part of the plate group,
    pouring a first sulfuric acid electrolyte into the container in an amount which is less than the total pore volume of the plate group,
    pouring a second sulfuric acid electrolyte into the container in an amount such that the total amount of poured electrolyte is at least equal to the total pore volume of the plate group, and
    sealing the container to form the sealed lead-acid battery.

2. A process for producing a sealed lead-acid battery according to claim 1 wherein said viscosity-increasing agent is at least one member selected from the group consisting of silicon oxide, aluminum oxide, titanium oxide and magnesium oxide.

3. A process for producing a sealed lead-acid battery according to claim 2 wherein the specific surface area of said viscosity increasing agent is larger than 200 m$^2$/g.

4. A process for producing a sealed lead-acid battery according to claim 1 wherein said separators include glass fibers having diameters greater than 1.0 micron.

5. A process for producing a sealed lead-acid battery according to claim 4 wherein the glass fibers which have diameters greater than 1.0 micron include glass fibers which have diameters of 10 to 20 microns.

6. A process for producing a sealed lead-acid battery according to claim 4 wherein the glass fibers in said separators are entangled together.

7. A process for producing a sealed lead-acid battery according to claim 1 wherein the positive and negative plates in said plate group are generally rectangular in shape, the height of said positive and negative plates is larger than 60 mm and the ratio of their height to their width is not less than 1.0.

8. A process for producing a sealed lead-acid battery according to claim 1 wherein the average concentration of said viscosity-increasing agent in the formed lead-acid battery is 0.01 to 4.0% by weight.

* * * * *